United States Patent [19]

Ashman et al.

[11] Patent Number: 4,773,725
[45] Date of Patent: Sep. 27, 1988

[54] TERMINATION OF A FIBER OPTIC TRANSMISSION MEMBER AND METHOD THEREFORE

[75] Inventors: John J. Ashman; Bernard G. Caron, both of Harrisburg, Pa.

[73] Assignee: AMP Incorporated, Harrisburg, Pa.

[21] Appl. No.: 946,114

[22] Filed: Dec. 24, 1986

Related U.S. Application Data

[60] Division of Ser. No. 719,022, Mar. 25, 1985, Pat. No. 4,648,688, which is a continuation of Ser. No. 381,495, May 24, 1982, abandoned.

[51] Int. Cl.$^4$ .................................................. G02B 6/36
[52] U.S. Cl. ............................ 350/96.20; 350/96.21; 350/320
[58] Field of Search ............... 350/96.10, 96.20, 96.21, 350/96.22, 96.23, 96.34, 320

[56] References Cited

U.S. PATENT DOCUMENTS

| 48,561 | 3/1882 | Schumacher | 350/96.20 |
|---|---|---|---|
| 3,410,950 | 11/1968 | Freudenberg | 174/84 |
| 3,947,088 | 3/1976 | French | 350/96.20 |
| 3,989,567 | 11/1976 | Tardy | 350/96.21 |
| 3,999,837 | 12/1976 | Bowen et al. | 350/96.22 |
| 4,047,796 | 9/1977 | Kao et al. | 350/96.20 |
| 4,050,781 | 9/1977 | Beauhaire | 350/96.20 |
| 4,061,416 | 12/1977 | Stewart | 350/96.20 |
| 4,186,996 | 2/1980 | Bowen et al. | 350/96.20 |
| 4,186,999 | 2/1980 | Harwood et al. | 350/96.21 |
| 4,201,443 | 5/1980 | Hodge | 350/96.20 |
| 4,204,306 | 5/1980 | Makuch | 350/96.20 X |
| 4,259,540 | 3/1981 | Sabia | 174/23 C |
| 4,300,815 | 11/1981 | Malsot et al. | 350/96.20 |
| 4,324,453 | 4/1982 | Patel | 350/96.23 |
| 4,362,356 | 12/1982 | Williams et al. | 350/96.20 |
| 4,368,948 | 1/1983 | Despouys | 350/96.20 |
| 4,396,514 | 8/1983 | Randisi | 252/30 |
| 4,464,013 | 8/1984 | Sabia | 350/96.23 |
| 4,494,822 | 1/1985 | Harvey | 350/96.21 |
| 4,648,688 | 3/1987 | Ashman et al. | 350/96.20 |

FOREIGN PATENT DOCUMENTS 55-108609  8/1980  Japan ............................ 350/96.20

OTHER PUBLICATIONS

"Designers Guide to Fiber Optics", AMP No. 228838-1, pp. 37-38, AMP Incorporated, Harrisburg, PA.
"Witco Cable Compound 7B", data sheet, 11/82, Sonneborn Division, Witco Chemical Corp., New York.
"FLEXGEL®", data sheet, 11/82, Sonneborn Division, Witco Chemical Corp., New York.

Primary Examiner—William L. Sikes
Assistant Examiner—Brian M. Healy
Attorney, Agent, or Firm—Adrian J. LaRue; Anton P. Ness

[57] ABSTRACT

A connector for a fiber optic member comprises a ferrule member in which is positioned an insert having rods surrounding a section of an exposed end of the fiber optic member, the exposed end extending along a front bore of the ferrule member. A crimping ferrule on the ferrule member is controllably crimped thereon thereby moving the rods into mechanical engagement with the fiber optic member with no or minimum deformation to the fiber optic member and securing the fiber optic member in the ferrule member. The method of terminating the fiber optic member includes surrounding the exposed end section with protective viscous material to protect the exposed end section from moisture and from becoming brittle, such as by filling the ferrule bore and the insert with the viscous material prior to inserting the fiber end thereinto.

10 Claims, 3 Drawing Sheets

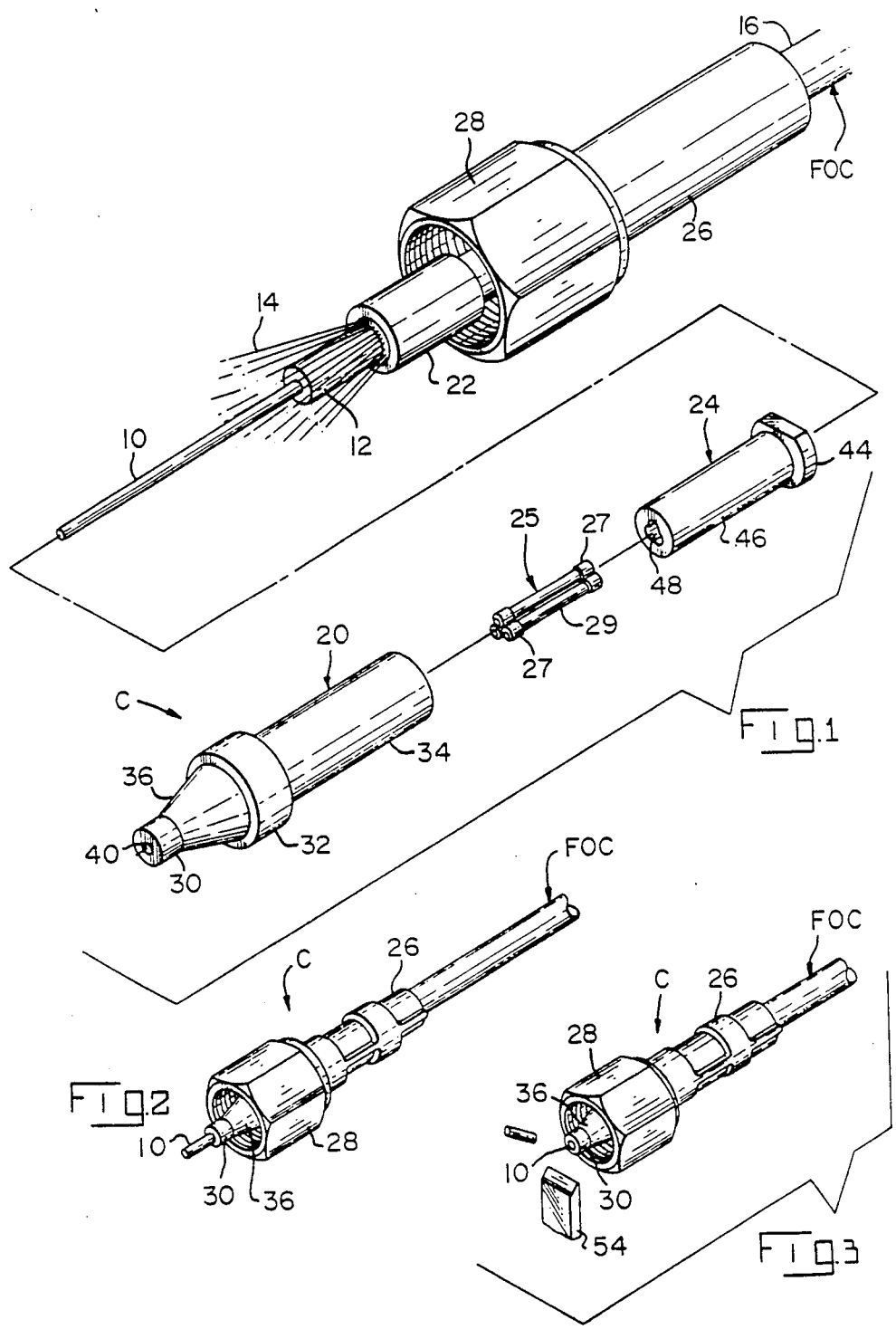

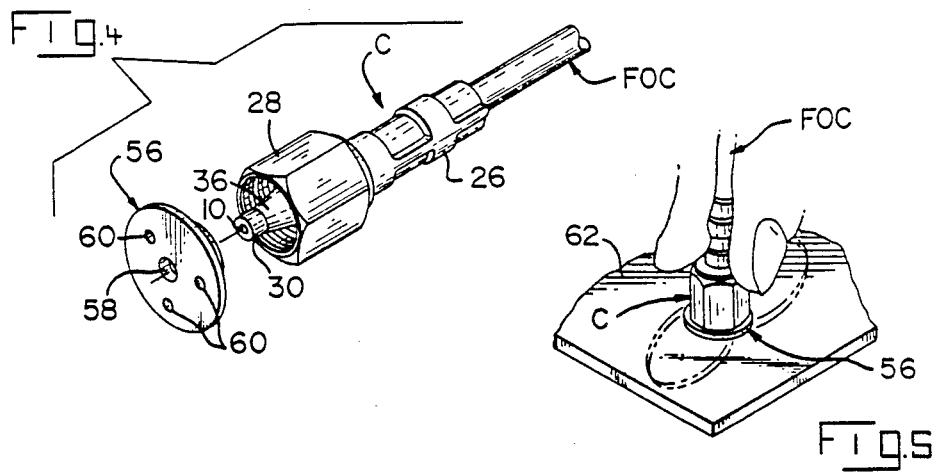
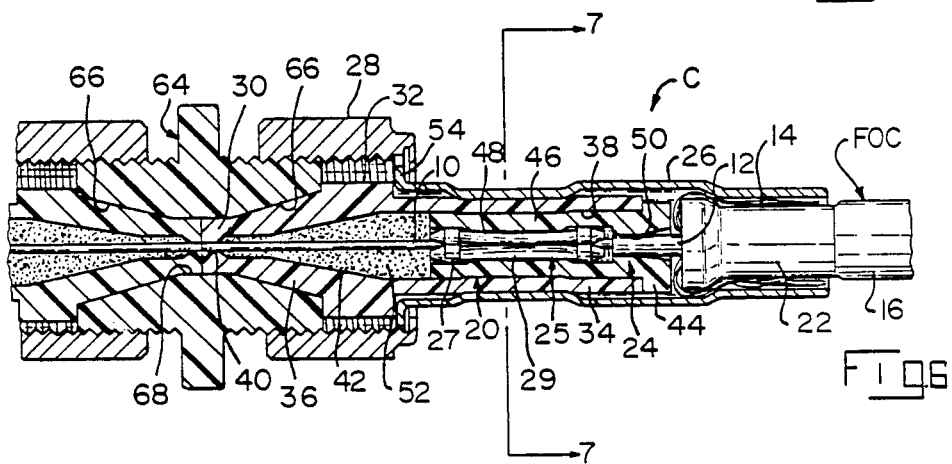
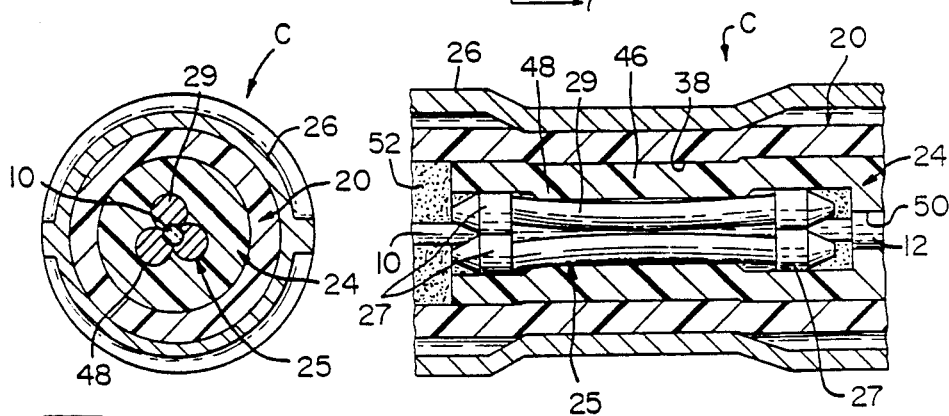

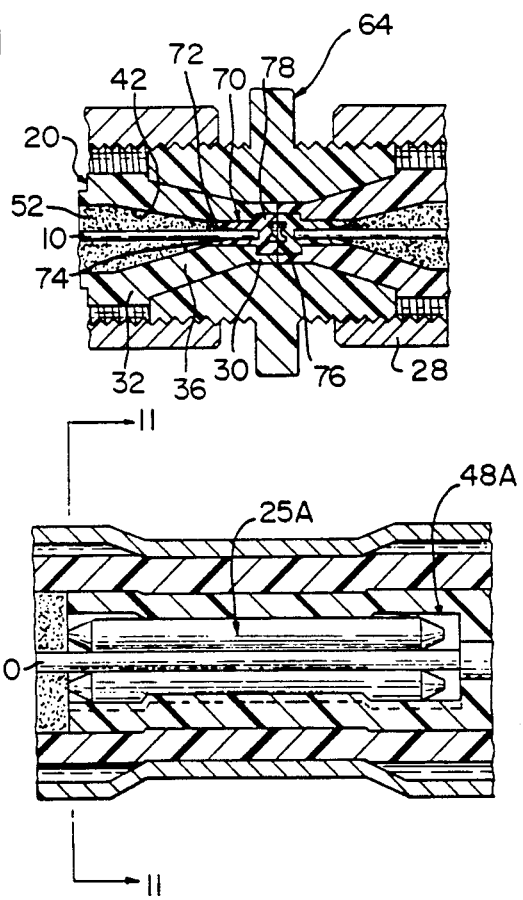
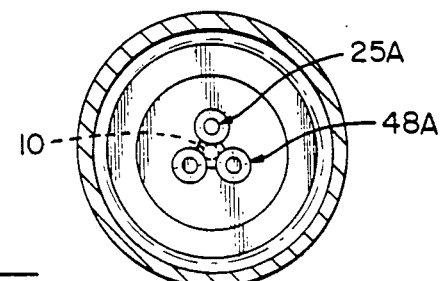

TERMINATION OF A FIBER OPTIC TRANSMISSION MEMBER AND METHOD THEREFORE

REFERENCE TO RELATED APPLICATIONS

This is a divisional of application Ser. No. 719,022 filed Mar. 25, 1985 now U.S. Pat. No. 4,648,688 which was a continuation of application Ser. No. 381,495 filed May 24, 1982, now abandoned.

FIELD OF THE INVENTION

This invention relates to a connector for a fiber optic member and includes an insert having rods surrounding an exposed end of the fiber optic member and is positioned within a ferrule opening with sections of the rods being moved into engagement with a section of the exposed fiber optic member when a crimping ring on the ferrule is crimped thereon.

BACKGROUND OF THE INVENTION

U.S. Pat. No. 3,999,837 discloses a connector for a fiber optic member which includes a ferrule in which the fiber optic member and protective jacket thereon is disposed with an exposed end of the fiber optic member extending along a front bore. Potting material is applied onto the exposed fiber optic member before or after the fiber optic member is inserted into the ferrule. The potting material begins to cure thereby partly retaining the fiber optic member in the ferrule while the crimping ring is crimped onto the ferrule which holds the parts in place while the potting material fully cures.

The use of potting material secures the fiber optic member in the ferrule, but it is messy, it is an extra step, and it takes time to cure. This is undesirable when terminations of fiber optic members need to be done at remote locations in the field and they need to be done quickly and easily.

An insert being positioned onto the buffer material covering the fiber optic member is disclosed in U.S. Pat. No. 4,447,121. The insert is placed in a ferrule and a crimping ferrule is crimped onto the ferrule which causes a fiber-engaging section of the insert to be reduced in diameter thereby secured onto the buffer material. This approach was effective for the buffer material in use at the time. The buffer material in current use is too soft and does not have the characteristics to enable an insert to be crimped thereon to effectively terminate an end of a fiber optic member.

SUMMARY OF THE INVENTION

According to the present invention, a connector for a fiber optic member comprises a ferrule member in which is positioned an insert having rods surrounding a section of an exposed end of the fiber optic member, the exposed end extending along a front bore of the ferrule member. A crimping ferrule on the ferrule member is controllably crimped thereon thereby moving rods into mechanical engagement with the fiber optic member with no or minimum deformation to the fiber optic member and securing the fiber optic member in the ferrule member. The method of the present invention comprises protecting the exposed end of the fiber optic member with viscous fluid, which protects it against moisture and also against becoming brittle. The viscous fluid is of the type which remains viscous over a wide temperature range.

According to another aspect of the present invention, the fiber optic member with buffer material thereover can be encased in an inner jacket having strength members covering the inner jacket and an outer jacket thereover which constitutes a fiber optic cable for use in telecommunications, data processing, or other electronic applications. An outer crimping ferrule is then used to crimp the strength members onto the ferrule member adjacent the crimping ferrule and to crimp onto the outer jacket to terminate the fiber optic cable for joining ends of such cable together or for connecting the cable to a light-transmitting or sensing member.

BRIEF DESCRIPTION OF THE DRAWINGS

FIG. 1 is a perspective exploded view of the connector and the fiber optic cable.

FIG. 2 is a view of FIG. 1 showning the connector fully crimped onto the fiber optic cable.

FIG. 3 is a view similar to FIG. 2 showing the end of the fiber optic member being removed.

FIG. 4 is a view similar to FIG. 3 showing a compressing and polishing fixture exploded therefrom.

FIG. 5 is a perspective view showing the polishing of the end of the fiber optic member.

FIG. 6 is a longitudinal section view of a splice connector for fiber optic cables using the connector of the present invention.

FIG. 7 is a cross-sectional view taken along line 7—7 of FIG. 6.

FIG. 8 is a longitudinal section view along the crimped area of the connector showing the engagement of the rods onto a section of the exposed fiber optic member.

FIG. 9 is a view similar to that of FIG. 8 showing an alternative embodiment.

FIG. 10 is a part longitudinal section view similar to that of FIG. 8 showing a further embodiment.

FIG. 11 is a view taken along line 11—11 of FIG. 10 prior to crimping.

DETAILED DESCRIPTION OF PREFERRED EMBODIMENTS

FIGS. 1 through 8 illustrate a connector C for terminating a fiber optic cable FOC. The fiber optic cable FOC includes a fiber optic member 10 which includes a core or light-transmitting member surrounded by cladding material to enable light to be transmitted therealong. An inner jacket 12 of plastic material surrounds a buffer material which covers fiber optic member 10 and lends strength to the cable to prevent the core or ligth-transmitting member from being broken since it can be made from glass or plastic material. Strength members 14 of plastic material or metal extend along inner jacket 12 to lend further strength to the cable and provide tensile strength thereto. An outer jacket 16 protects the entire cable assembly. The fiber optic cable FOC is stripped as illustrated in FIG. 1 to expose a length of strength members 14, inner jacket 12, and fiber optic member 10 to enable the stripped fiber optic cable to be terminated onto connector C.

Connector C includes a ferrule member 20, a metal ring 22, an insert 24, rods 25, and a crimping ferrule 26 on which is captured a threaded nut 28.

Ferrule member 20 is made from a suitable plastic material having resilient characteristics and preferably fabricated by molding. Ferrule member 20 is of the type disclosed in U.S. Pat. No. 3,999,837, the disclosure of which is completely incorporated herein by reference.

It has a front cylindrical section 30, a central cylindrical section 32, and a rear cylindrical section 34, each of the cylindrical sections having a different diameter as can be discerned. A conical section 36 extends between sections 30 and 32. A rear bore 38 extends through section 34. A front bore 40 extends through front cylindrical section 30 and has a dimeter to receive fiber optic member 10 therethrough, whereas rear bore 38 has a diameter to receive insert 24 therein. Conical section 36 has a conical bore 42 extending between bores 38 and 40.

Insert 24 is molded from a suitable plastic material and includes a flange 44 and a cylindrical section 46. A rod-receiving bore means 48 having a trifoliate configuration extends through insert 24 to circular bore 50 having a beveled entrance to accommodate fiber optic transmission member 10 of the fiber optic cable FOC. The axes of the trifoliate sections of bore 48 are located at 120° intervals and they respectively receive therein a fiber-engaging means, which is rods 25.

Rods 25 as shown by FIGS. 1, 6 and 8 are dumbbell shaped so that ends 27 engage one another when rods 25 are inserted into the respective trifoliate sections of bore 48 thereby maintaining circular sections 29 spaced from one another parallel to the axis of bore 48 to enable fiber optic member 10 to be threaded therethrough. The ends of ends 27 are tapered to facilitate insertion of rods 25 within the trifoliate sections as well as to facilitate passage of fiber optic member 10 therealong. Rods 25 are press fit into the trifoliate sections of bore 48 so that ends 27 frictionally maintain rods 25 within the trifoliate sections. Rods 25 are used for fiber optic members having diameters of 125 to 140 microns.

The triangular-shaped fiber-receiving opening formed by the engagement of ends 27 when rods 25 are in position in the trifoliate sections of bore 48 is large enought to enable fiber optic member 10 to pass through rods 25 prior to being crimped onto fiber optic member 10. For larger diameter fiber optic members, rods 25A, as shown in FIG. 10, have the same diameter therealong with the ends tapered for the reasons that ends 27 are tapered. Rods 25A, as shown in FIG. 11, are frictionally held in position in the trifoliate sections of bore 48A prior to being crimped onto fiber optic member 10 to enable the fiber optic member to move freely therealong. Rods 25 and 25A are formed of a material softer than that of fiber optic member 10.

To terminate fiber optic cable FOC by a connector C, the fiber optic cable is stripped as illustrated in FIG. 1 to expose strength members 14, inner jacket 12, and fiber optic member 10.

Connector C is in an assembled condition with a viscous material such as a commercially-available moisture resistant and protective resin 52 in the conical bore 42 and part of bore 38 of ferrule member 20; insert 24 with rods 25 or 25A in position in the trifoliate sections of bore 48 isin bore 38 with flange 44 engaging the end of ferrule memeber 20; member 20 and also contains protecture resin 52; and crimping ferrule 26 with threaded nut 28 thereon is positioned on section 34 with the flared section disposed adjacent section 32 of ferrule member 20.

Connector C in its assembled condition is ready to be positioned on the stripped end of the fiber optic cable and to be terminated thereon according to the following procedure. Resin 52 is viscous over the wide temperature range to which the connector will be subjected during in-service use; thus it will not run out of the ferrule member. Resin 52 protects the fiber optic member 10 from moisture and from becoming brittle.

Metal ring 22 is placed on the end of outer jacket 16; the stipped end of fiber optic cable FOC is inserted into the assembled connector C with fiber optic member 10 extending through the triangular-shaped opening of rods 25, 25A, resin 52, and bore 40 with an end of fiber optic member 10 extending beyond the end of section 30 as shown in FIG. 2. Strength members 16 fold back over metal ring 22.

A conventional crimping tool (not shown) is positioned onto crimping ferrule 26 over metal ring 22 and the crimping tool is controllably operated to crimp this section of crimping ferrule 26 onto strength members 14 and metal ring 22. This reduces metal ring 22 causing it to be crimped onto outer jacket 16 and strength members 14 are captured between metal ring 22 and crimping ferrule 26. This provides a strain relief for the termination.

The crimping tool is next placed on crimping ferrule 26 over the rods and controllably operated to crimp crimping ferrule 26 onto section 34 of ferrule member 20 and move at least central parts of the rods into engagement with the section of fiber optic member 10 therealong.

In the case of rods 25, during the crimping action, central parts of sections 29 are first moved into engagement with the fiber optic member 10 causing the central parts of sections 29 to be deformed in cross-section because the material of rods 25 is softer than the fiber optic member, and then the central parts of sections 29 engage each other in the last stage of the crimping operation causing cross-sectional deformation thereof. Very minimal deformation of the fiber optic member takes place when the central parts of sections 29 are crimped onto the fiber optic member 10 thereby causing no appreciable degradation of the light-transmitting characteristics of fiber optic member. This also results in an effective mechanical termination of the fiber optic member. Sections 29 in their final crimped configurations are slightly arcuate shaped as shown in FIG. 8.

In the case of rods 25A as shown in FIG. 10, they are crimped onto fiber optic member 10 in the same manner as sections 29 of rods 25 except that the entire lengths of rods 25A with the exception of the tapered ends are crimped into engagement with the fiber optic member thereby mechanically securing the fiber optic member in position in the connector.

Upon conclusion of crimping connecotr C onto fiber optic cable FOC with an end of fiber optic member 10 extending outwardly from the end of section 30 as shown in FIG. 2, a scribing tool 54 is used as shown in FIG. 3 to scribe the fiber optic member along the end of section 30, if it is glass, and then the end of the fiber optic member is broken free of the fiber optic member. If the fiber optic member 10 is plastic, it will be cleaved by a suitable cleaving tool.

A compression and polishing fixture 56, as shown in FIG. 4, is threadably secured onto connector C with sections 30 and 36 mated within a profiled bore 58 of fixture 56; bore 58 has the same configurations as that of sections 30 and 36 except that they are dimensioned to compress section 30 into tight engagement with the fiber optic member 10 in bore 40 and a slight part of section 30 extends beyond the outer surface of fixture 56 when fixture 56 is threaded onto connector C. Buttons 60 extend outwardly from the outer surface of fixture 56.

Connector C with fixture 56 thereon is now subjected to a polishing action by moving fixture 56 in a figure eight configuration along a polishing film 62 of very fine silicon carbide or aluminum oxide grit as shown in FIG. 5 for a period of time. Buttons 60 stabilize the polishing and, when they are worn away, the end of section 30 along with the end of fiber optic member 10 are polished and are in the same plane. Fixture 56 is removed from connector C and connector C is now properly and completely terminated on fiber optic cable FOC.

After ends of the fiber optic cable have been terminated by connectors C, the connectors can be secured onto a coupling bushing 64 as shown in FIG. 6. The bore of coupling bushing 64 has identical conical bores 66 leading to a central cylindrical bore 68. When threaded nuts 28 of connectors C threadably engage coupling bushing 64, bores 66 engage conical sections 36 of ferrule members 20 to radially compress these sections of the ferrule members 20 thereby causing resilient radial deformation thereof which biases the fiber optic member to a stable position within central cylindrical bore 60 which will align fiber optic members 10 therein. The radial compression of two similar resilient ferrule members witnin a commonly shaped bore 60 will bias corresponding light-transmitting members or cores 10 into coincident alignment even though the cladding layers over the light transmission members or cores are of different diameters. Connector C of a terminated fiber optic cable can also be connected with a light-transmitting or light-sensing member in the manner disclosed in U.S. Pat. No. 4,186,996.

An alternative embodiment is shown in FIG. 9 wherein a lens member 70 is secured in sections 30 and 36 of ferrule member 20. Section 72 of lens member 70 has a conical bore 74 in communication with bore 42 and terminating adjacent lens section 76 which is surrounded by an annular section 78. Fiber optic member has to be trimmed to proper length to abut against the end of bore 74 which also guides the end of the fiber optic member into lens member 70. No removing of an exposed end of the fiber optic member and of polishing the end of the connector as shown in FIGS. 3 through 5 is necessary when the connector of FIG. 9 is used. Lens member 70 will collimate the light transmitted along fiber optic member 10 and annular sections 78 will engage when the connectors are coupled in coupling bushing 64. Resin 52 will protect the exposed fiber optic member as hereinabove set forth.

I claim:

1. A method for terminating a fiber optic transmission member of a fiber optic cable means, comprising the steps of:
   preparing an end portion of the fiber optic cable means for termination including removal of a selected end length of jacket material of the cable means surrounding the fiber optic transmission member, exposing an end length of said fiber otic transmission member;
   selecting a viscous material having the property of being moisture resistant;
   surrounding said exposed fiber end length with said viscous material;
   disposing said exposed fiber end length in a bore of a ferrule means such that a front end of said exposed fiber end length is disposed within a front bore in a front ferrule section for optical connection with a mating connector means, and the remaining length of said exposed fiber end length is disposed along a bore portion of said ferrule means rearward from said front ferrule section; and
   mechanically securing said ferrule means at least to said fiber optic cable means whereby said exposed fiber end length is protected by said viscous material from moisture and from becoming brittle.

2. A method as set forth in claim 1 wherein said viscous material is disposed in said bore of said ferrule means, and said surrounding step comprises insertion of said exposed fiber end length into said bore.

3. A method as set forth in claim 1 wherein a fiber-engaging insert is placed within said bore portion of said ferrule means in a rearward ferrule section thereof, viscous material is disposed in said bore of said ferrule means and within said fiber-engaging insert prior to insertion of said exposed fiber end length through said fiber-engaging insert and said bore of said ferrule means, and said fiber-engaging insert is moved into mechanically securing engagement with said exposed fiber end length.

4. A method as set forth in claim 3 wherein said mechanical securing step includes placing a crimping sleeve around said rearward ferrule section containing said fiber-engaging insert and around an end section of said jacket material of said fiber optic cable means, and crimping said crimping sleeve at both locations, thereby securing said fiber-engaging insert to said exposed fiber end length and securing said ferrule means both to said fiber-engaging insert and to said fiber optic cable means.

5. A termination of a fiber optic transmission member of a fiber optic cable means comprising:
   an end portion of a fiber optic cable means having a selected end length of jacket material removed therefrom exposing an end length of a fiber optic transmission member;
   ferrule means including a front section having a front end face and a rear section having a rear end face and further including a profiled bore therethrough from said front end face to said rear end face, said exposed fiber end length extending along said profiled bore from said rear end face to said front end face;
   means mechanically securing said ferrule means to at least said fiber optic cable means; and
   viscous moisture-resistant material surrounding said exposed fiber end length at least within said rear section of said ferrule means protecting said exposed fiber end length from moisture and from becoming brittle.

6. A termination as set forth in claim 5 further including a fiber-engaging means secured within said profiled bore in said rear ferrule section and mechanically securing said exposed fiber end length within said ferrule means, and viscous material surrounds said exposed fiber end length within said fiber-engaging means.

7. A termination as set forth in claim 5 wherein said viscous material is selected to have the property of remaining viscous over the wide temperature range to which the termination will be subjected during in-service use.

8. A terminal assembly for terminating a fiber optic transmission member of a fiber optic cable means comprising:
   a ferrule member including a front section having a front end face and a rear section having a rear end face and further including a profiled bore therethrough from said front end face to said rear end face, said profiled bore adapted to receive therethrough an exposed fiber end length of said fiber optic transmission member of said fiber optic cable means inserted thereinto from said rear end face;

fiber-engaging insert means secured within said rear section of said ferrule means and having a fiber-receiving passageway therethrough coaxial with said profiled ferrule bore and adapted to receive therethrough said exposed fiber end length inserted from a rear end thereof, and further adapted to be moved into mechanically securing engagment with said exposed fiber end length after said fiber end length has been inserted therethrough;

means to secure said ferrule member to said fiber optic cable means; and viscous moisture-resistant material disposed at least within said rear section of said ferrule member and within said fiber-engaging insert means to protect an exposed fiber end length inserted and secured therewithin from moisture and from becoming brittle.

9. A terminal assembly as set forth in claim 8 wherein said viscous material has sufficient viscosity to retain itself within said rear section of said ferrule member and within said fiber-engaging insert means.

10. A terminal assembly as set forth in claim 9 wherein said viscous material is selected to have the property of remaining viscous over the wide temperature range to which the termination will be subjected during in-service use.

* * * * *

UNITED STATES PATENT OFFICE
CERTIFICATE OF CORRECTION

Patent No. 4,773,725            Dated September 27, 1988

Inventor(s) John J. Ashman

It is certified that error appears in the above-identified patent and that said Letters Patent are hereby corrected as shown below:

Title page:   item "[75] Inventors:" is corrected to read:

"[75] Inventor: John J. Ashman, of Harrisburg, Pa."

Signed and Sealed this

Seventh Day of March, 1989

Attest:

DONALD J. QUIGG

Attesting Officer      Commissioner of Patents and Trademarks